(No Model)
T. E. PADEN.
DETACHABLE HANDLE FOR COOKING UTENSILS.
No. 585,284. Patented June 29, 1897.
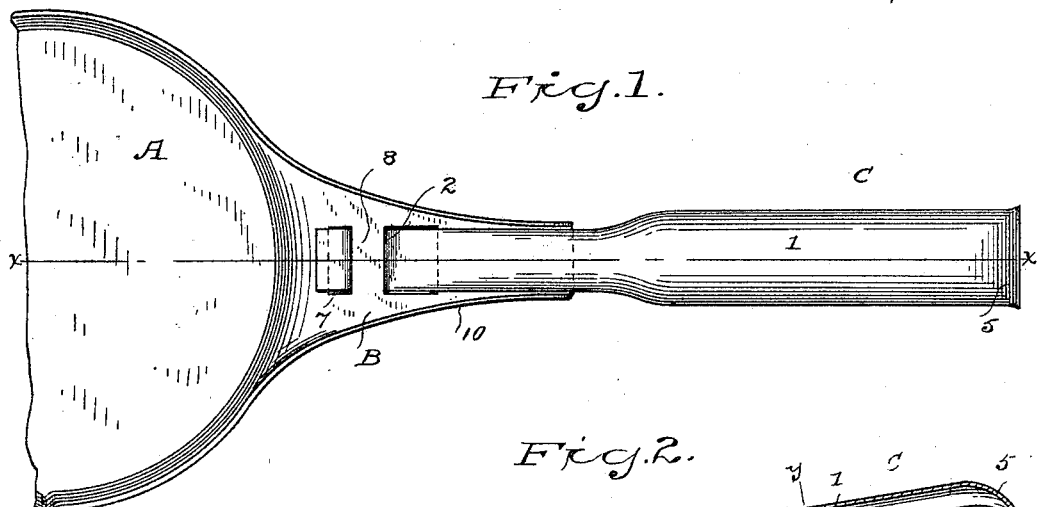
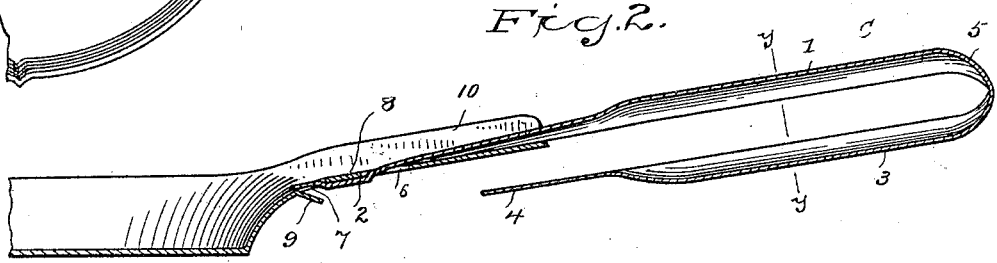
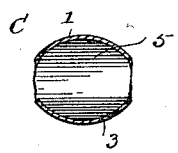
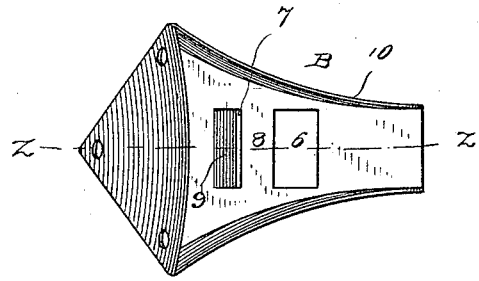
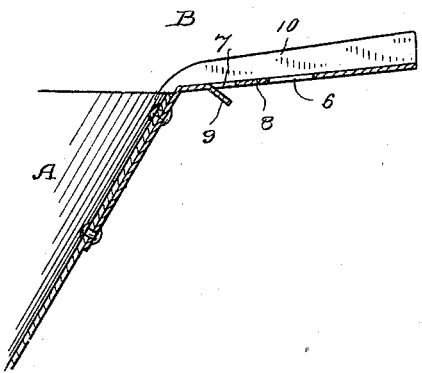
WITNESSES
H. A. Lamb
S. V. Heley
INVENTOR
Thomas E. Paden
By A. M. Wooster
Atty.

UNITED STATES PATENT OFFICE.

THOMAS E. PADEN, OF ANSONIA, CONNECTICUT.

DETACHABLE HANDLE FOR COOKING UTENSILS.

SPECIFICATION forming part of Letters Patent No. 585,284, dated June 29, 1897.

Application filed March 6, 1897. Serial No. 626,252. (No model.)

*To all whom it may concern:*

Be it known that I, THOMAS E. PADEN, a citizen of the United States, residing at Ansonia, in the county of New Haven and State of Connecticut, have invented certain new and useful Improvements in Detachable Handles for Cooking Utensils; and I do hereby declare the following to be a full, clear, and exact description of the invention, such as will enable others skilled in the art to which it appertains to make and use the same.

My invention has for its object to provide a detachable handle for cooking utensils which shall not add materially to the cost of the utensil and shall be so constructed that it may be applied to utensils already in use, or the utensil may be so constructed as to adapt it to receive my novel detachable handle.

It is of course well understood that ordinary metal handles of frying-pans, stew-pans, &c., become heated in use, so that it is impossible to handle the utensil without placing a non-conducting holder between the hand and the utensil, and, furthermore, that when a number of cooking utensils are in use upon a stove the handles are frequently seriously in the way. In order to overcome these objections, I have devised a detachable handle which may be applied to any utensil fitted to receive it as conveniently as an ordinary lifter is applied to a stove-lid and which, moreover, will grip the utensil firmly, so that it may be tilted should the user desire to pour out the contents.

In the accompanying drawings, forming part of this specification, Figure 1 is a plan view of a frying-pan especially adapted to receive my novel detachable handle and showing the handle in place thereon; Fig. 2, a section on the line *x x* in Fig. 1; Fig. 3, a section on the line *y y* in Fig. 2; Fig, 4, a plan view of an ear adapted to be riveted to a utensil already in use and adapted to receive my novel handle, and Fig. 5 is a section on the line *z z* in Fig. 4 and showing an independent ear in place upon a utensil ready to receive my novel detachable handle.

A denotes a cooking utensil, which may be an ordinary frying-pan, stew-pan, or other cooking utensil, and B an ear, which may be formed integral with the utensil, as in Figs. 1 and 2, or may be formed independently thereof and riveted thereto, as in Fig. 5.

C denotes my novel handle, which is ordinarily made of spring metal, bent backward upon itself, leaving the arms separated, and is preferably curved in cross-section, as clearly shown in Figs. 2 and 3, in order to give the greatest possible amount of strength and rigidity with a given weight or thickness of metal, it being contemplated that my novel handle shall be blanked out and formed from a strip of sheet metal. So far as the application of my novel handle is concerned it is wholly immaterial whether the utensil is cast or formed from sheet metal. The arms of the handle are of unequal length. The upper arm I have specifically indicated by 1. This arm is preferably provided near its end with a transverse depression 2, the purpose of which will presently be explained. The lower arm is specifically indicated by 3 and is made sufficiently long, so that when attached to the ear the free end thereof, which I have indicated by 4, will lie on the under side of the ear and will be adapted to be pressed upward against it when the handle is grasped by the user.

I have shown the arms as made from a single piece of metal and the spring connection between them, which I have specifically indicated by 5, as a portion of the metal of the handle, which is bent backward upon itself at this point. I have not deemed it necessary to show other forms of spring connections, as it is obvious that any ordinary spring connection may be used without departing from the spirit of my invention. The ear is provided with an opening 6, through which the end of the upper arm is passed from above, and with an opening 7, through which the end of the upper arm is passed from below. Between these openings is a cross-piece 8, which when the handle is attached lies in depression 2 in the upper arm of the handle. In practice I preferably leave the metal which is pressed out to form opening 7 attached at the end toward the utensil, simply bending the flap of metal downward at an angle to form a guide 9, with which the end of the handle comes in contact when it is raised, after being passed through opening 6, to insert it in opening 7, the guide rendering it practically impossible for the end of the upper arm to move laterally and rendering it practically certain that it will pass into opening 7 without special effort on the part of the user.

The operation will be readily understood from the drawings. In attaching the handle the operator simply passes the upper arm of the handle downward through opening 6, then presses the outer end of the handle downward, lifting the upper arm of the handle, which comes in contact with guide 9 and passes upward into opening 7, cross-piece 8 on the ear resting in depression 2 in the upper arm. When the operator grasps the handle, the lower arm will be pressed upward, and the free end 4 of this arm will engage the under side of the ear, thus gripping the ear firmly between the two arms and enabling the user to tilt the utensil should it be desired to pour out the contents. As an additional safeguard and in order to prevent the handle from slipping laterally on the utensil when it is tilted in the act of pouring I provide flanges 10 at the sides of the ears, between which the upper arm lies, as clearly shown in Fig. 2. In gripping the ear it is obvious that the upper arm will lie closely on the upper side of the ear and between the flanges, and the lower arm will lie closely on the lower side of the ear, so that there will not be the slightest danger of the handle slipping laterally on the utensil.

Having thus described my invention, I claim—

1. The combination with the ear of a cooking utensil having openings 6 and 7 with a cross-piece between them, of a handle consisting of upper and lower arms having a spring connection at their outer ends, the upper arm being shaped to pass downward through opening 6 and upward through opening 7 and having a depression to receive the cross-piece, and the lower arm being adapted to lie on the under side of the ear and to be pressed upward when the handle is grasped so that the ear will be gripped between the arms.

2. The combination with the ear of a cooking utensil having openings 6 and 7 with a cross-piece between them, and a guide extending downward from the inner side of opening 7, of a handle consisting of upper and lower arms having a spring connection at their outer ends, the upper arm being shaped to pass downward through opening 6 and to be directed upward through opening 7 by the guide and having a depression to receive the cross-piece, substantially as described.

3. The combination with the ear of a cooking utensil having openings 6 and 7 and flanges 10 upon its sides, of a handle consisting of upper and lower arms having a spring connection at their outer ends, the upper arm being shaped to pass downward through opening 6 and upward through opening 7 and having a depression to receive the cross-piece and the lower arm being adapted to lie on the under side of the ear so that in use the ear will be clamped between the upper and lower arms, the upper arm lying between the flanges whereby lateral movement is prevented.

In testimony whereof I affix my signature in presence of two witnesses.

THOMAS E. PADEN.

Witnesses:
JAMES F. TORRANCE,
WALTER S. TORRANCE.